(12) United States Patent
Tseng et al.

(10) Patent No.: US 8,806,814 B2
(45) Date of Patent: Aug. 19, 2014

(54) PHOTOVOLTAIC ARRAY SYSTEM, PHOTOVOLTAIC DEVICE THEREOF, AND FRAME ELEMENT OF PHOTOVOLTAIC DEVICE THEREOF

(75) Inventors: Huang-Chi Tseng, Hsin-Chu (TW); De-Chih Liu, Hsin-Chu (TW); Ming-Yuan Huang, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 106 days.

(21) Appl. No.: 13/593,647

(22) Filed: Aug. 24, 2012

(65) Prior Publication Data
US 2013/0174891 A1 Jul. 11, 2013

(30) Foreign Application Priority Data

Jan. 6, 2012 (TW) .............................. 101100596 A (51) Int. Cl.
*H01L 23/14* (2006.01)
*H01L 23/12* (2006.01)
*H01L 31/048* (2014.01)

(52) U.S. Cl.
USPC ........... 52/173.3; 126/621; 136/244; 136/251

(58) Field of Classification Search
USPC .......... 52/173.3; 136/244, 245, 251; 126/621, 126/622, 623; 248/237
See application file for complete search history.

(56) References Cited

U.S. PATENT DOCUMENTS

| | | | | |
|---|---|---|---|---|
| 4,372,292 A * | 2/1983 | Ort | | 126/622 |
| 4,498,822 A * | 2/1985 | Diba | | 410/2 |
| 4,832,001 A * | 5/1989 | Baer | | 126/579 |
| 6,111,189 A * | 8/2000 | Garvison et al. | | 136/244 |
| 6,465,724 B1 * | 10/2002 | Garvison et al. | | 136/244 |
| 6,928,775 B2 * | 8/2005 | Banister | | 52/173.3 |
| 6,967,278 B2 * | 11/2005 | Hatsukaiwa et al. | | 136/251 |
| 7,574,842 B2 * | 8/2009 | Russell | | 52/768 |
| 7,592,537 B1 * | 9/2009 | West | | 136/251 |
| 7,681,363 B2 * | 3/2010 | Banister | | 52/173.3 |
| 7,832,157 B2 * | 11/2010 | Cinnamon | | 52/173.3 |
| 7,854,095 B2 * | 12/2010 | Banister | | 52/173.3 |
| 7,866,098 B2 * | 1/2011 | Cinnamon | | 52/173.3 |
| 7,915,519 B2 * | 3/2011 | Kobayashi | | 136/251 |

(Continued)

FOREIGN PATENT DOCUMENTS

CA 2004980 A * 6/1990
KR 20100109322 A 10/2010

(Continued)

OTHER PUBLICATIONS

Letter from EPO dated Mar. 14, 2013 and extended EPO search report for Application No. EP 12189846 completed on Mar. 5, 2013 (3 pages total).*

*Primary Examiner* — Basil Katcheves
*Assistant Examiner* — Rodney Mintz
(74) *Attorney, Agent, or Firm* — WPAT, PC; Justin King (57) ABSTRACT

The disclosure provides a photovoltaic array system, a photovoltaic device of the photovoltaic array system, and a frame element of the photovoltaic device of the photovoltaic array system. The frame element includes a groove, a receiving hole and a metal wire. The groove extends along a longitudinal axial direction of the frame element for holding one lateral side of a photovoltaic panel. The receiving hole extends along the longitudinal axial direction for receiving the metal wire therein, and is parallel to the longitudinal axial direction.

15 Claims, 10 Drawing Sheets

(56) References Cited

U.S. PATENT DOCUMENTS

| | | | |
|---|---|---|---|
| 7,963,813 B2* | 6/2011 | Buller et al. | 439/884 |
| 7,987,641 B2* | 8/2011 | Cinnamon | 52/173.3 |
| 8,025,508 B2* | 9/2011 | Parker et al. | 439/92 |
| 8,104,239 B2* | 1/2012 | Fath | 52/173.3 |
| 8,273,981 B2* | 9/2012 | Kobayashi | 136/251 |
| 8,404,963 B2* | 3/2013 | Kobayashi | 136/244 |
| 8,479,463 B2* | 7/2013 | Gee et al. | 52/222 |
| 8,480,333 B2* | 7/2013 | Demay | 405/212 |
| 8,511,009 B2* | 8/2013 | Kobayashi et al. | 52/173.3 |
| 8,595,996 B2* | 12/2013 | Korman et al. | 52/173.3 |
| 8,640,402 B1* | 2/2014 | Bilge | 52/173.3 |
| 2006/0053706 A1* | 3/2006 | Russell | 52/173.3 |
| 2007/0102036 A1* | 5/2007 | Cinnamon | 136/244 |
| 2008/0057776 A1* | 3/2008 | Cummings | 439/382 |
| 2008/0066801 A1* | 3/2008 | Schwarze | 136/251 |
| 2008/0078440 A1* | 4/2008 | Lim et al. | 136/251 |
| 2008/0168981 A1* | 7/2008 | Cummings et al. | 126/600 |
| 2008/0268687 A1* | 10/2008 | Dixon et al. | 439/320 |
| 2009/0019796 A1* | 1/2009 | Liebendorfer | 52/173.3 |
| 2009/0078299 A1* | 3/2009 | Cinnamon et al. | 136/244 |
| 2009/0184223 A1* | 7/2009 | Schwarze et al. | 248/237 |
| 2010/0000516 A1* | 1/2010 | Conger | 126/569 |
| 2010/0166502 A1* | 7/2010 | Demay | 405/215 |
| 2010/0180933 A1 | 7/2010 | Aftanas et al. | |
| 2011/0047903 A1* | 3/2011 | Kobayashi | 52/173.3 |
| 2011/0162301 A1* | 7/2011 | Ueda et al. | 52/173.3 |
| 2011/0162689 A1* | 7/2011 | Ueda et al. | 136/244 |
| 2011/0209745 A1* | 9/2011 | Korman et al. | 136/251 |
| 2011/0284058 A1* | 11/2011 | Cinnamon | 136/251 |
| 2011/0308566 A1* | 12/2011 | Johnson | 136/244 |
| 2011/0314752 A1* | 12/2011 | Meier | 52/173.3 |
| 2012/0222718 A1* | 9/2012 | Sweeney | 136/244 |
| 2012/0255596 A1* | 10/2012 | Korman et al. | 136/251 |
| 2013/0312812 A1* | 11/2013 | Meyer et al. | 136/246 |
| 2013/0333310 A1* | 12/2013 | Damo | 52/173.3 |
| 2014/0007926 A1* | 1/2014 | Korman et al. | 136/251 |
| 2014/0030028 A1* | 1/2014 | DeMay | 405/212 |
| 2014/0157693 A1* | 6/2014 | Schumacher | 52/173.3 |

FOREIGN PATENT DOCUMENTS

| | | |
|---|---|---|
| TW | M331754 | 5/2008 |
| TW | M372546 | 1/2010 |
| TW | M386600 | 8/2010 |
| TW | 201207331 | 2/2012 |

* cited by examiner

PHOTOVOLTAIC ARRAY SYSTEM, PHOTOVOLTAIC DEVICE THEREOF, AND FRAME ELEMENT OF PHOTOVOLTAIC DEVICE THEREOF

RELATED APPLICATIONS

This application claims priority to Taiwan Patent Application Serial Number 101100596, filed Jan. 6, 2012, which is herein incorporated by reference.

BACKGROUND

1. Technical Field

The present invention relates to a frame element, and more particularly to a photovoltaic array system, a photovoltaic device of the photovoltaic array system, and a frame element of the photovoltaic device of photovoltaic array system.

2. Related Art

A conventional photovoltaic device is configured with a solid outer frame fixing and surrounding the photovoltaic device, so as to enhance the overall structure of the photovoltaic device for protecting the photovoltaic device.

Since the photovoltaic device installed at the exterior of a building has to be considered to prevent the damages on the photovoltaic device caused by the pressure of the external environment (e.g. wind pressure or weight of snow), thus, the related designers mostly modify the structure of the outer frame by thickening or strengthening the outer frame. Therefore, it not only wastes the material of the outer frame and the reinforcing components thereof, but also increases the labor cost and manufacturing cost for making the outer frame. Furthermore, the thickened outer frame also increases the total weight of the photovoltaic device.

As what is disclosed above, the conventional photovoltaic device still has the mentioned inconvenience and shortages, thereby requiring an improvement. As such, how to effectively solve the mentioned inconvenience and shortages shall be a serious issue to be concerned.

SUMMARY

According to one embodiment of the present disclosure, a frame element of a photovoltaic device includes an elongated main body, a groove and at least one metal wire. The elongated main body extends along a long axial direction, and the elongated main body is provided with at least one elongated receiving hole extending along the long axial direction. The groove is formed on one surface of the main body, and extends along the long axial direction for receiving and holding one side of a photovoltaic panel. The metal wire is installed in the receiving hole, and extends along the long axial direction.

The accompanying drawings are included to provide a further understanding of the disclosure, and are incorporated in and constitute a part of this specification. The drawings illustrate embodiments of the disclosure and, together with the description, serve to explain the principles of the disclosure.

BRIEF DESCRIPTION OF THE DRAWINGS

The present disclosure will be apparent to those skilled in the art by reading the following detailed description of embodiments thereof, with reference to the attached drawings, in which.

DESCRIPTION OF THE EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

According to the present disclosure, a frame element of a photovoltaic device is longitudinally penetrated by at least one metal wire, and the extending direction of the metal wire is the same as the extending direction of one side of a photovoltaic panel of the photovoltaic device. As such, when the photovoltaic device is pressed by an external force, the photovoltaic device is not easy to be bent and deformed due to the metal wire having the capability of stretch resistance and resisting the external pressure.

Figures 1A, 1B:
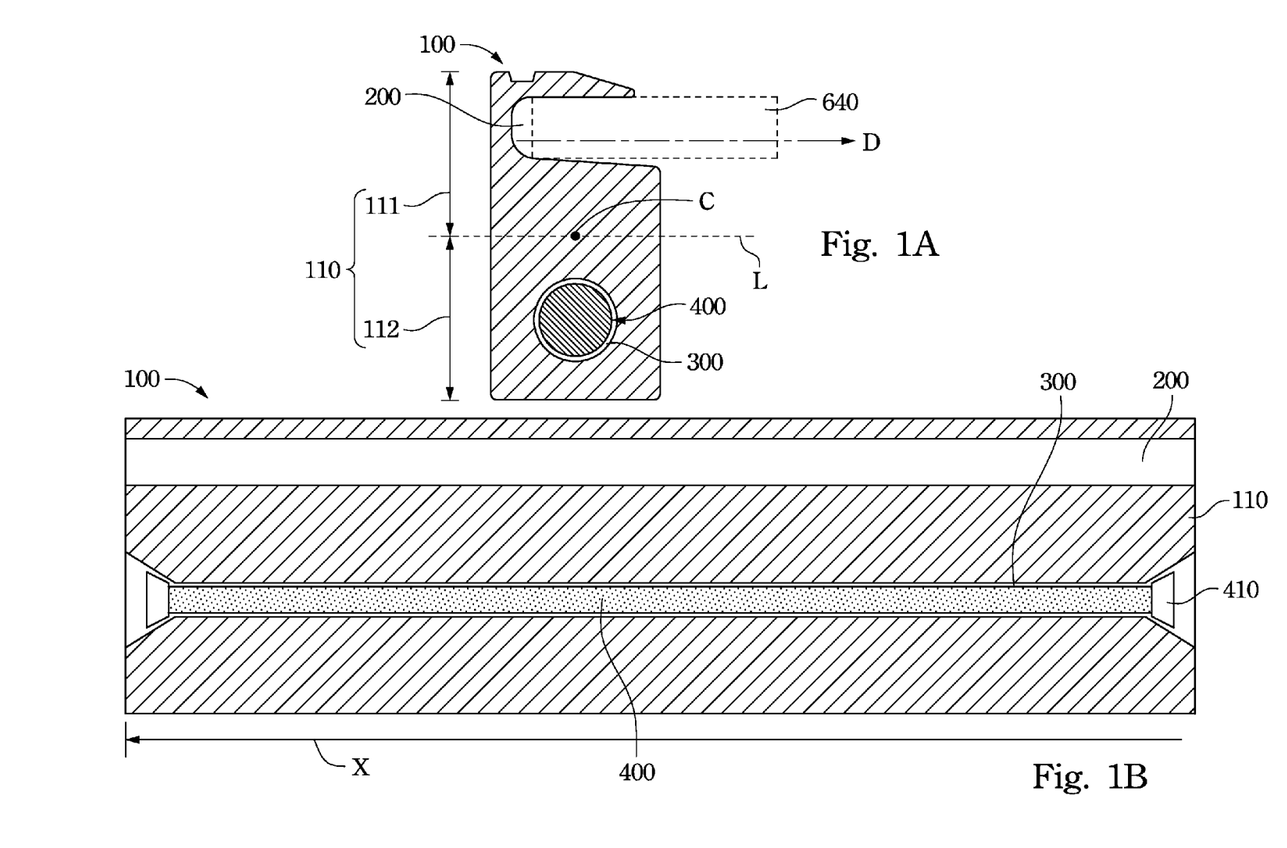
FIG. 1A is a horizontal cross-sectional view illustrating a frame element of a photovoltaic device according to one alternative of one embodiment of the present disclosure.
FIG. 1B is a longitudinal cross-sectional view illustrating the frame element of the photovoltaic device according to one alternative of this embodiment of the present disclosure.

Reference is now made to FIG. 1A and FIG. 1B. FIG. 1A is a horizontal cross sectional view illustrating a frame element 100 of a photovoltaic device according to one alternative of one embodiment of the present disclosure, and FIG. 1B is a longitudinal cross sectional view illustrating the frame element 100 of the photovoltaic device according to one alternative of this embodiment of the present disclosure.

According to this embodiment of the present disclosure, the first frame element 100 of the photovoltaic device includes a first elongated main body 110, a first groove 200, at least one first receiving hole 300 and at least one first metal wire 400. The quantity of the at least one first receiving hole 300 is not less than the quantity of the at least one first metal wire 400.

As to the substantial structure of the first frame element 100, the first elongated main body 110 extends along a first longitudinal axial direction X, and the appearance of the first elongated main body 110 is such as one of frame strips of an outer frame of the photovoltaic device. When the first elongated main body 110 is extruded to be an elongated frame stripe, the material forming the first elongated main body 110 is not limited to metal or non-metal.

The first groove 200 is disposed on one surface of the first elongated main body 110, and is formed in an elongated shape and extends along the first longitudinal axial direction X, so that the first groove 200 receives and holds one side of a photovoltaic panel 640. The photovoltaic panel 640 is fixed in the first groove 200 and extends out of the first groove 200 along a horizontal direction D.

The first groove 200 penetrates through two opposite ends of the first elongated main body 110, or does not penetrate through two opposite ends of the first elongated main body 110, i.e., the first groove 200 is enclosed by the first elongated main body 110. However, the present disclosure is not limited to the aforementioned arrangement.

The first receiving hole 300 is formed in the first elongated main body 110, and extends along the first longitudinal axial direction X. According to this embodiment, the first receiving hole 300 penetrates through two ends of the first elongated main body 110. The first metal wire 400 is formed in a linear shape, and the opening diameter of the first metal wire 400 is substantially the same as the opening diameter of the first receiving hole 300, such that when the first metal wire 400 is inserted into the first receiving hole 300 linearly, the first metal wire 400 can be matched and received in the first receiving hole 300 in parallel to the first longitudinal axial direction X.

However, the present disclosure is not limited to the aforementioned arrangement, and the first metal wire 400 can also be transversely installed into the first receiving hole 300 of the first elongated main body 110 along a direction perpendicular to the first longitudinal axial direction X.

In addition, two opposite ends of the first metal wire 400 are respectively installed with two stop blocks 410. After the first metal wire 400 is installed in the first receiving hole 300, the two stop blocks 410 are respectively restrained in the receiving hole 300, so that the first metal wire 400 is fastened in the first receiving hole 300.

For example, the volume of the stop block 410 is larger than the opening diameter of the first receiving hole 300, so that the two stop blocks 410 are securely restrained at the two outer sides of the first receiving hole 300, so as to enable the first metal wire 400 to be received and stretched in the first receiving hole 300. However, according to the present disclosure, the means for fastening the first metal wire 400 in the first receiving hole 300 is not limited to the aforementioned arrangement, e.g., a conventional means utilizing C-shaped rings or screws to restrain the two stop blocks 410 at the outer sides of the first receiving hole 300 for stretching the first metal wire 400 can also be adopted.

Figure 1C:
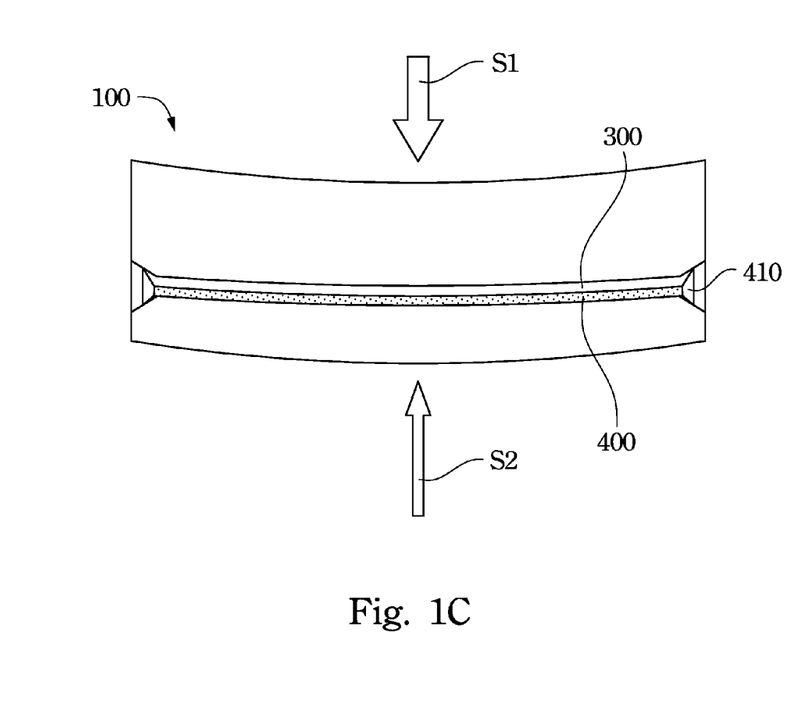
FIG. 1C is a schematic view illustrating the frame element of the photovoltaic device being pressed by an external force according to one alternative of this embodiment of the present disclosure.

FIG. 1C is a schematic view illustrating the frame element 100 of the photovoltaic device 630 being pressed by an external force according to one alternative of this embodiment of the present disclosure.

As shown in FIG. 1A, the first elongated main body is partitioned into a first half part 111 and a second half part 112 by an imaginary separation line L (or imaginary central line) which horizontally passes through a centroid C of a horizontal cross surface of the first elongated main body 110 along the aforementioned horizontal direction D, and the aforementioned first groove 200 is in the first half part 111. The aforementioned first metal wire 400 (including the first receiving hole 300) is in the second half part 112. In other embodiments of the present disclosure, the imaginary separation line can also be an imaginary central line of the first elongated main body.

As such, when the photovoltaic device (not shown in the figures) having the first frame element 100 is installed at the exterior of a building, the second half part 112 of the first frame element 100 is closer to the ground relative to the first half part 111. Because the aforementioned first metal wire 400 (including the first receiving hole 300) is in the second half part 112, the first metal wire 400 can be defined to be at the lower part of the first frame element 100.

As such, as shown in FIG. 1C, when the photovoltaic device (not shown in figures) having the first frame element 100 is pressed by an external force, if the upward pressure S1 (such as wind pressure or loading of accumulated snow) is greater than the downward pressure S2 (e.g., wind pressure), a downward deformation is generated in the first frame element 100. At this moment, because the first metal wire 400 is fastened in the first receiving hole 300, the first metal wire 400 can be used to resist the pressure, thereby reducing the bent and deformed degree of the photovoltaic device. In addition, after the external pressure is removed, an elastic recovery force can be generated in the deformed first metal wire 400, so that the first frame element 100 is able to restore back to the original state.

Figure 2:
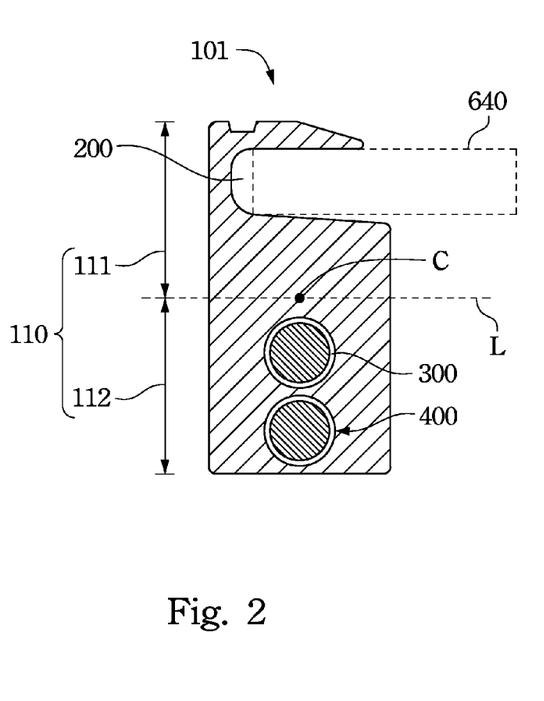
FIG. 2 is a horizontal cross-sectional view illustrating a frame element of a photovoltaic device according to another alternative of this embodiment of the present disclosure.

According to one alternative of this embodiment, it can be understood that the more quantity of the first metal wires 400 the lower part of the first frame element 101 (e.g., 2 pieces as shown in FIG. 2) has, the better bending resistant force the first metal wires 400 has, especially when the arranged direction of the first metal wires 400 is perpendicular to the aforementioned imaginary separation line L passing through the centroid C.

Figure 3A:
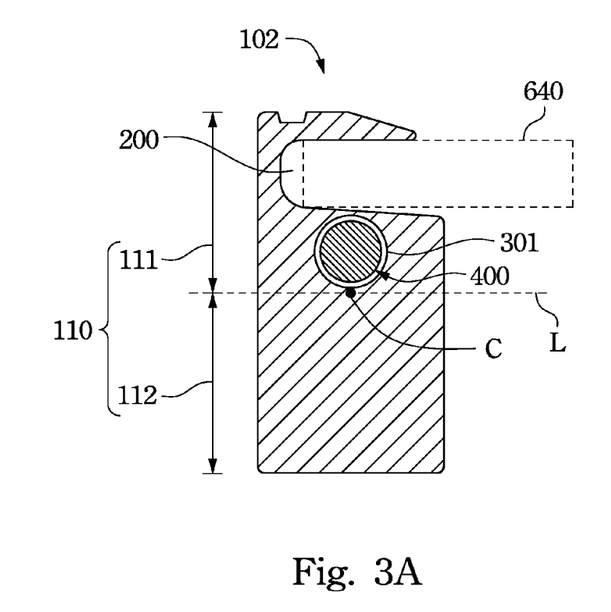
FIG. 3A is a horizontal cross-sectional view illustrating a frame element of a photovoltaic device according to one another alternative of this embodiment of the present disclosure.
Figure 3B:
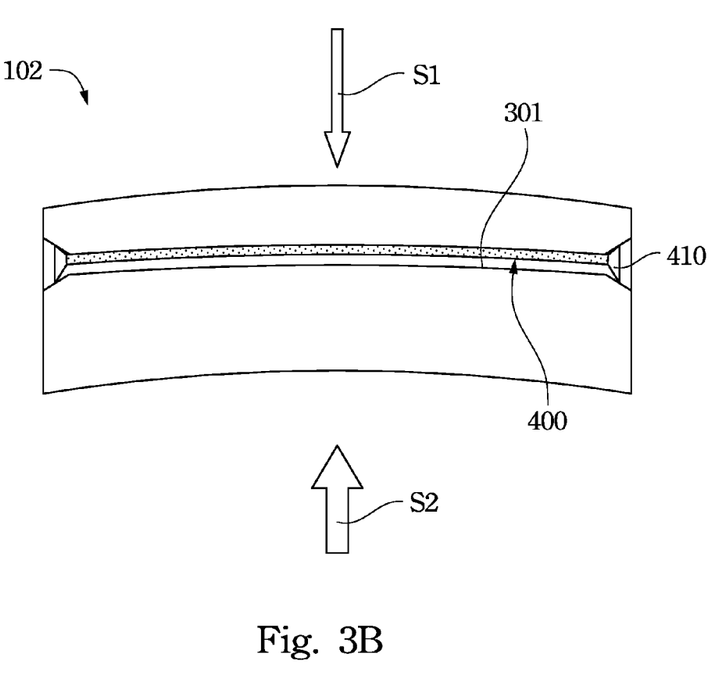
FIG. 3B is a longitudinal cross-sectional view illustrating the frame element of the photovoltaic device according to one another alternative of this embodiment of the present disclosure.

Reference is now made to FIG. 3A and FIG. 3B. FIG. 3A is a horizontal cross-sectional view illustrating a frame element 102 of a photovoltaic device according to one another alternative of this embodiment of the present disclosure, and FIG. 3B is a longitudinal cross-sectional view illustrating the frame element 102 of the photovoltaic device according to one another alternative of this embodiment of the present disclosure.

As shown in FIG. 3A, when the aforementioned imaginary separation line L is used to partition the first elongated main body 110 into the first half part 111 and the second half part 112, the aforementioned first groove 200 and the first metal wire 400 (including a first receiving hole 301) are all arranged in the first half part 111.

As such, when the photovoltaic device (not shown in the figures) having the first frame element 102 is installed at the exterior of a building, the second half part 112 of the first frame element 100 is closer to the ground relative to the first half part 111. Because the aforementioned first metal wire 400 (including the first receiving hole 301) is in the first half part 111, the first metal wire 400 can be defined to be at the upper part of the first frame element 100.

Thus, when the photovoltaic device (not shown in the figures) having the first frame element 102 is pressed by an external force (as shown in FIG. 3B), if the downward pressure S2 (e.g., wind pressure) is greater than the upward pressure S1 or there is no upward pressure exerted thereon, an upward deformation is generated in the first frame element 102. At this moment, since the first metal wire 400 is stretched in the first receiving hole 301, so the first metal wire 400 can be used to resist the pressure, thereby reducing the bent and deformed degree of the photovoltaic device.

In addition, after the stretched first metal wire 400 is bent and deformed, an elastic recovery force can be generated in the stretched first metal wire 400 so as to assist the first frame element 102 to restore to its original state after the external pressure is removed.

According to another alternative of the present disclosure, it is understood that the more quantity of the first metal wires 400 the upper part of the first frame element 102 has, the better bending resistant force the first metal wires 400 has, especially when the arranged direction of the first metal wires 400 is perpendicular to the aforementioned imaginary separation line L.

Figure 4:
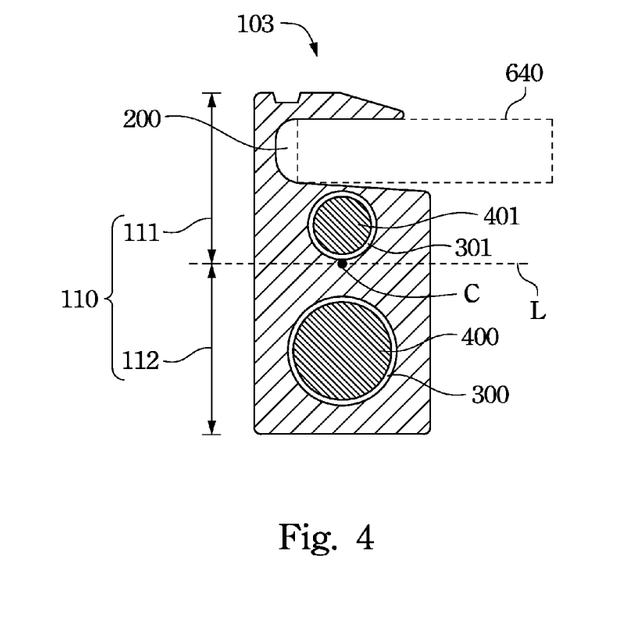
FIG. 4 is a horizontal cross-sectional view illustrating the frame element of the photovoltaic device according to still one another alternative of this embodiment of the present disclosure.

FIG. 4 is a horizontal cross-sectional view illustrating a frame element 103 of a photovoltaic device according to still one another alternative of this embodiment of the present disclosure.

When the aforementioned imaginary separation line L partitions the first elongated main body 110 into the first half part 111 and the second half part 112, the aforementioned first groove 200 is in the first half part 111, and the quantity of the first metal wires 400, 401 (including the first receiving holes 300, 301) is plural, e.g., two or four pieces, and respectively disposed in the first half part 111 and the second half part 112.

As such, whether the second half part 112 of the first frame element 103 which is closer or farther away from the ground relative to the first half part 111, or the photovoltaic device (not shown in figures) having the first frame element 103 is subject to a greater upward pressure S1 or downward pressure S2, the first frame element 103 disclosed in one another alternative of the embodiment can still be adopted.

In addition, the first metal wire can not only be disposed above or below or at two sides of the aforementioned imaginary separation line, and the first metal wire disposed right on the imaginary separation line exactly is also disclosed in the present disclosure.

For example, the arranged direction of the two first metal wires 400, 401 shown in FIG. 4 is perpendicular to the aforementioned imaginary separation line L, and the aforementioned imaginary separation line L is disposed between the two first metal wires 400, 401. The cross-sectional area (diameter) of the first metal wire 401 in the first half part 111 is smaller than that of the first metal wire 400 in the second half part 112.

Figure 5A:
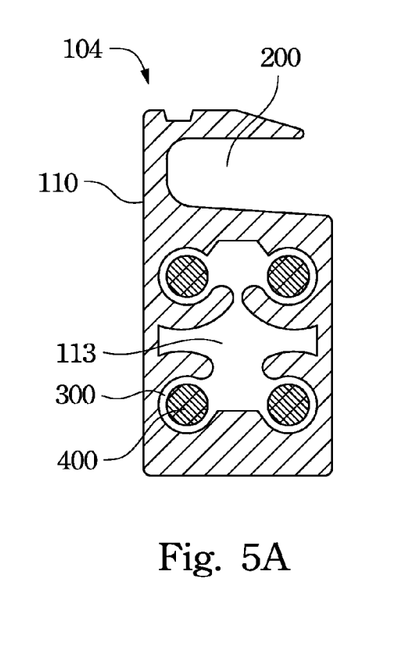
FIG. 5A to FIG. 5C are horizontal cross-sectional views respectively illustrating frame elements with respect to photovoltaic device according to other alternatives of this embodiment of the present disclosure.
Figure 5B:
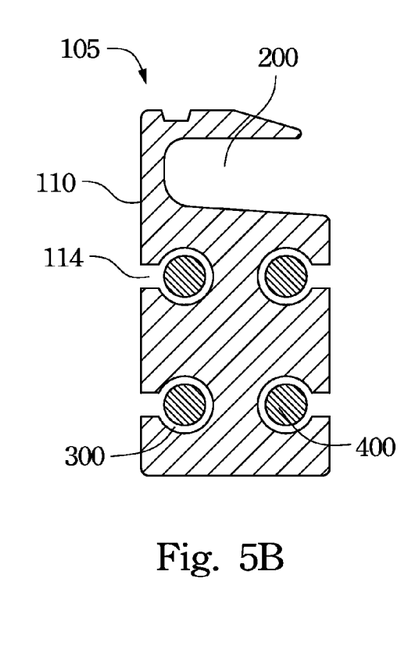
Figure 5C:
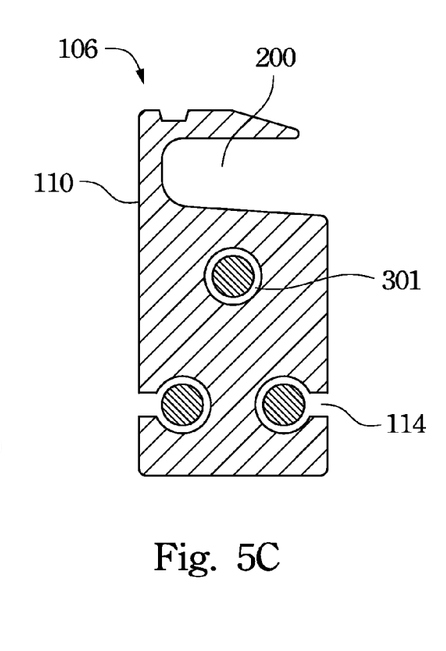

Reference is now made to FIG. 5A to FIG. 5C. FIG. 5A to FIG. 5C are horizontal cross-sectional views respectively illustrating frame elements 104, 105, 106 with respect to a photovoltaic device according to other alternatives of this embodiment of the present disclosure.

As one of other alternatives, the first frame element 104 or 105 of the first elongated main body 110 has a plurality (e.g., four pieces as shown in FIG. 5A and FIG. 5B) of first receiving holes 300 correspondingly arranged. In addition, in FIG. 5A, the first elongated main body 110 of the first frame element 104 has a hollow chamber 113 communicating with each of the first receiving holes 300. As such, the weight of the first frame element 104 can be greatly reduced.

As one of other alternatives, as shown in FIG. 5B and FIG. 5C, two opposite surfaces, extending along the first longitudinal axial direction X, of the first elongated main body 110 of the first frame element 105 or 106 are respectively formed with two lateral slits 114, and the lateral slits 114 respectively extend along the first longitudinal axial direction X and longitudinally communicate with the first receiving holes 300. Thus, with the lateral slits 114, the first metal wire 400 is allowed to be transversely installed in the first receiving hole 300 of the first elongated main body 110 along a direction perpendicular to the first longitudinal axial direction X, so as to provide another way to install the first metal wire 400. According to this embodiment, the installation of the first metal wire 400 being inserted in the first receiving hole 300 through the lateral slit 114 is easier to be carried out.

As one of other alternatives, as shown in FIG. 5A and FIG. 5B, the first metal wires 400 (including the first receiving holes 300) are symmetrically arranged in the first elongated main body 110; however, the present disclosure is not limited to the aforementioned arrangement, as shown in FIG. 5C, the first metal wires 400 (including the first receiving holes 300) can also be designed to be asymmetrically arranged in the first elongated main body 110.

Reference is now made to FIG. 6A to FIG. 6D. FIG. 6A to FIG. 6D are horizontal cross-sectional views respectively illustrating metal wires respect to the frame element 100 of the photovoltaic device according to other alternatives of this embodiment of the present disclosure.

As one of other alternatives, as shown in FIG. 1A, the first metal wire 400 only consists of a singular metal wire (e.g., stainless steel wire), which is defined as a wire having singular circular cross-section (e.g., 2.5 mm).

Figure 6A:
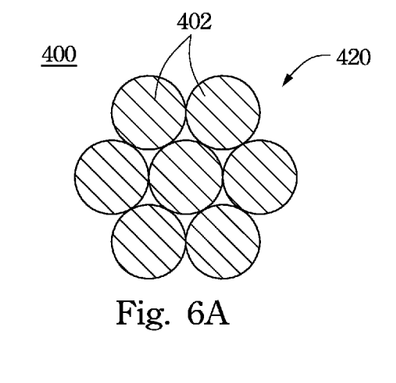
FIG. 6A to FIG. 6D are horizontal cross-sectional views respectively illustrating metal wires with respect to a frame element of a photovoltaic device according to other alternatives of this embodiment of the present disclosure.

As one of other alternatives, as shown in FIG. 6A, the first metal wire 400 can be a metal cable 420 (e.g., stainless steel cable) formed by a bundle of metal wires 402 (e.g., stainless steel wires).

Figure 6B:
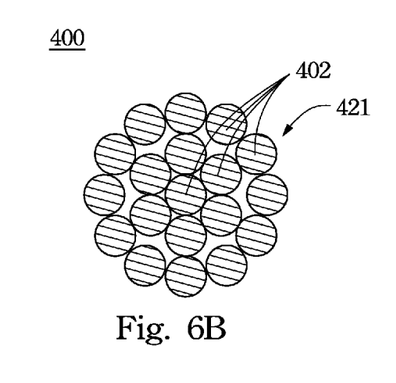

As one of other alternatives, as shown in FIG. 6B, the first metal wire 400 can be a metal cable 421 (e.g., stainless steel cable) formed by a bundle of metal wires 402 (e.g., stainless steel wires) and configured in a structure in which multiple circles are formed outwards from a center thereof.

Figure 6C:
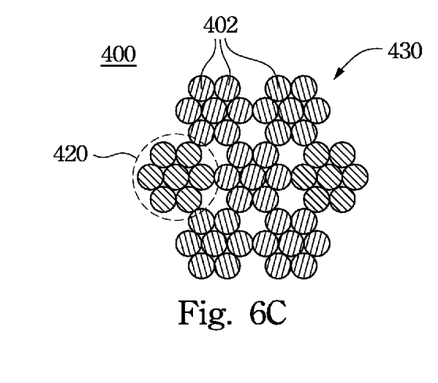
Figure 6D:
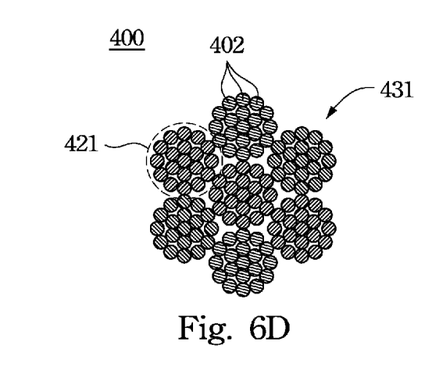

As one of other alternatives, as shown in FIG. 6C and FIG. 6D, the first metal wire 400 can be a bundled member 430 or 431 (e.g., stainless steel cable) formed by one or more metal cables 420 or 421.

However, the present disclosure is not limited to the disclosed arrangement. Moreover, the diameter and quantity of the first metal wire 400 are not limited thereto and can be designed according to the actual tension resistant force required by certain module.

What shall be explained is that the metal wire provided by the present disclosure is capable of resisting the axial stretching force, but not capable of resisting the axial compressing force.

Figure 7:
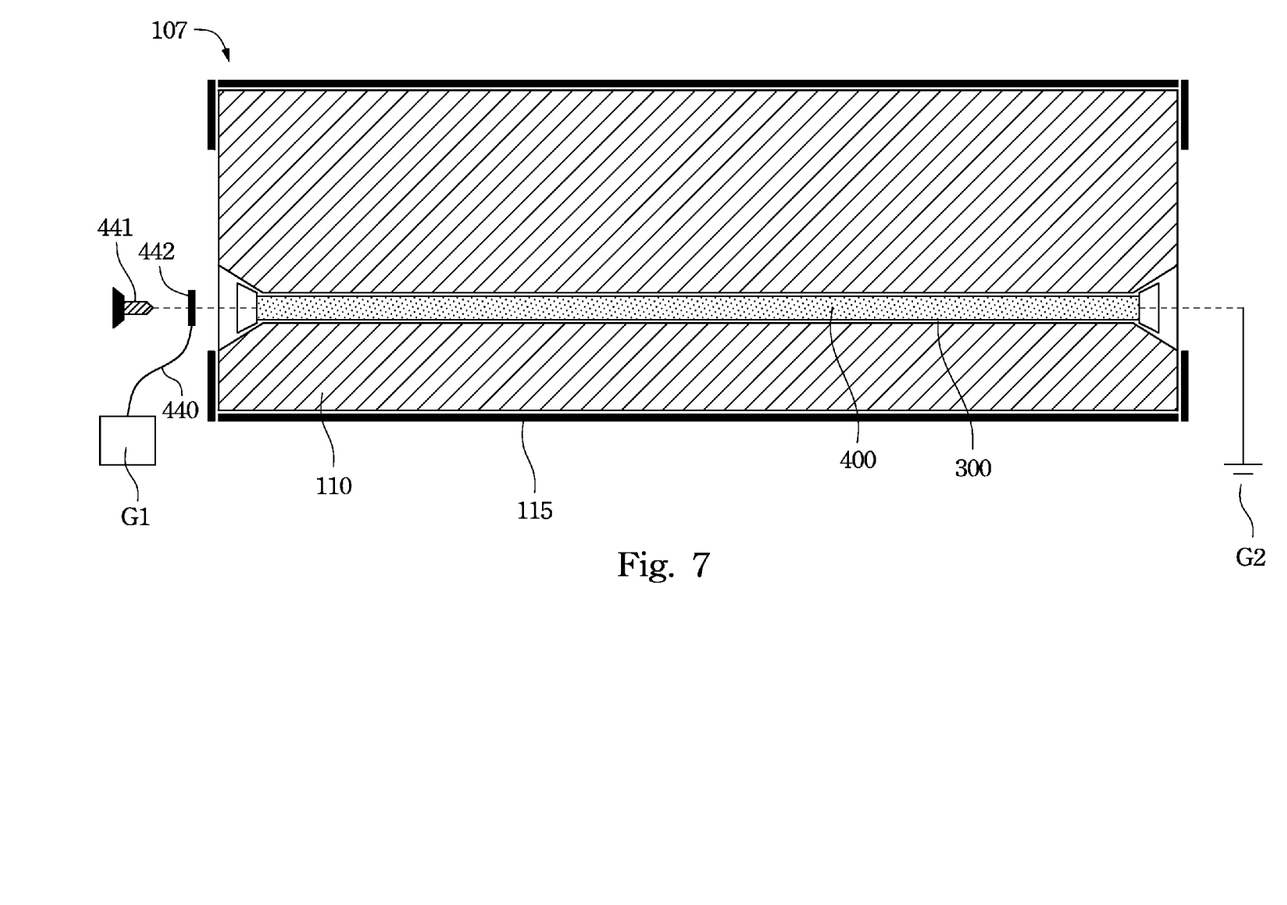
FIG. 7 is a horizontal cross-sectional view illustrating the frame element of the photovoltaic device according to another embodiment of the present disclosure.

FIG. 7 is a horizontal cross-sectional view illustrating a frame element 100 of a photovoltaic device 630 according to another embodiment of the present disclosure.

According to another embodiment of the present disclosure, the outer surface of a first elongated main body 110 is provided with an anodizing layer 115. The anodizing layer 115 is defined as an oxide film formed on all surfaces of the first elongated main body 110, and the anodizing layer 115 has properties of anti corrosion, anti oxidation and electrical insulation.

In addition, according to another embodiment of the present disclosure, the first frame element 100 further includes a ground wire 440. One end of the ground wire 440 is electrically connected to one end of the metal wire 400, and the other end thereof is electrically connected to a ground source G1 of the photovoltaic panel 640, and the other end of the first metal wire 400 is electrically connected to a ground terminal G2. As such, because of the first metal wire 400, the photovoltaic panel 640 can be electrically connected to the ground terminal G2 through with the first metal wire 400 for effectively eliminating a noise signal or static electricity, so as to reduce the possibilities of the photovoltaic device 630 being suffered from electromagnetic interference or static electricity discharging.

Substantially, a fastening member 441 is utilized to fasten and lock a ground washer 442 of the ground wire 440 on the stop block 410 (FIG. 3B) of the metal wire 400, so that the noise signal or static electricity of the photovoltaic panel 640 can be successfully eliminated through the first metal wire 400 to the ground terminal G2.

According to one alternative of the another embodiment of the present disclosure, the first receiving hole 300 of the first elongated main body 110 is not processed with an anodizing treatment on the inner wall of the first elongated main body 110, and thus when the noise signal or static electricity can be guided to the first metal wire 400, the first elongated main body 110 having the electric conductive property can be used to jointly transmit the noise signal or static electricity to the ground terminal G2.

Figure 8A:
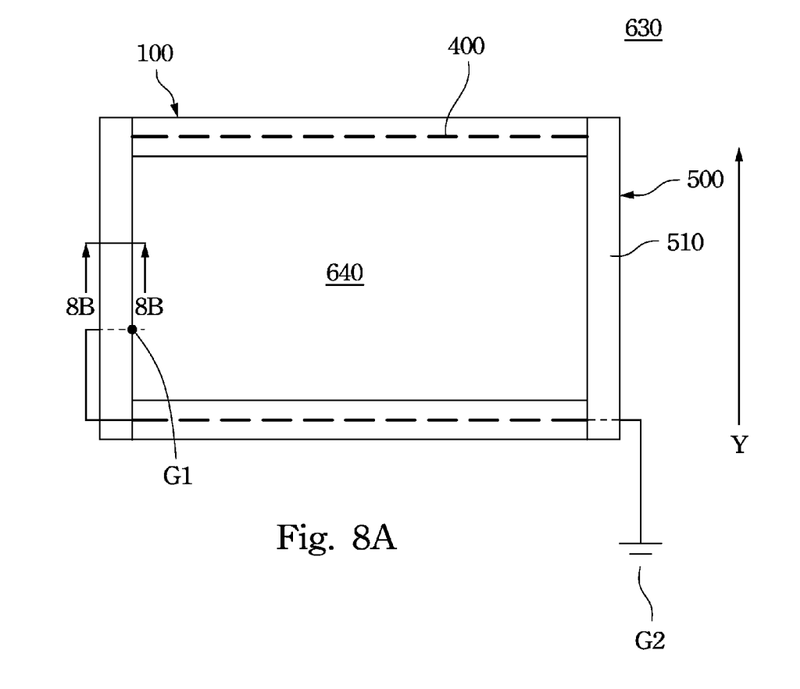
FIG. 8A is a top view of the photovoltaic device according to one embodiment of the present disclosure.
Figure 8B:
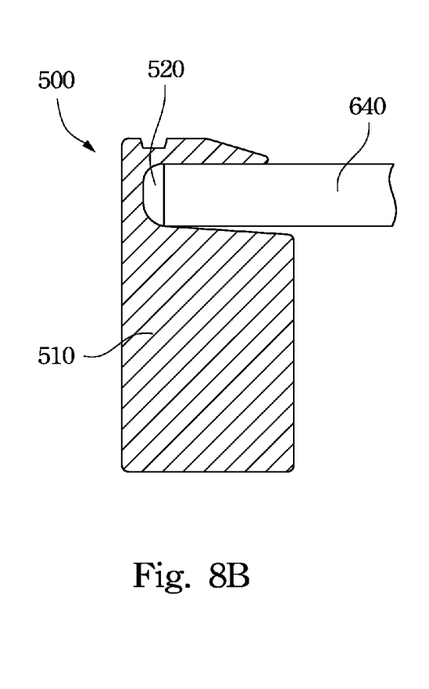
FIG. 8B is a cross sectional view viewed along line 8B-8B in FIG. 8A.

Reference is now made to FIG. 8A to FIG. 8B. FIG. 8A is a top view of a photovoltaic device according to one embodiment of the present disclosure, and FIG. 8B is a cross-sectional view viewed along line 8B-8B shown in FIG. 8A.

According to the present disclosure, the photovoltaic device 630 includes a photovoltaic panel 640, two aforementioned first frame elements 100 and two second frame elements 500. The two first grooves 200 are arranged to face towards each other, and used to respectively receive and hold two opposite long sides of the photovoltaic panel 640.

Each second frame element 500 includes a second elongated main body 510 and a second groove 520. The second elongated main body 510 is formed in an elongated shape, i.e., the second elongated main body 510 is formed as one of the frame strips of the outer frame, and extends along a second longitudinal axial direction Y, wherein the second longitudinal axial direction Y is perpendicular to the first longitudinal axial direction X. The second groove 520 is formed on one surface of the second elongated main body 510, and formed in an elongated shape and extends along the second longitudinal axial direction Y, so as to receive and hold one short side of the photovoltaic panel 640. As such, the periphery (four sides) of the photovoltaic panel 640 is enclosed by the first frame elements 100 and the second frame elements 500.

In addition, according to the present disclosure, the second frame elements 500 at the short sides of the photovoltaic panel 640 can also be installed with a straightly stretched metal wire. The second frame element 50 further includes a second receiving hole and a second metal wire (referring to numerals 300, 400 in FIG. 1A). The second receiving hole extends along the second longitudinal axial direction Y, and is perpendicular to the first longitudinal axial direction X. The second metal wire is matched with the second receiving whole and coordinately fastened in the second receiving hole, and is parallel to the second longitudinal axial direction Y.

Beside the arranged direction of the second frame element 500 arranged in perpendicular to the first frame element 100, the properties and alternatives of the second elongated main body 510, the second groove 520, the second receiving hole and the second metal wire of the second frame element 500 can all adopt the properties and alternative of the first elongated main body 110, the first groove 200, the first receiving hole 300 and the first metal wire 400 of the first frame element 100 which have been disclosed in the previous embodiment, and therefore no further illustration is provided.

Figure 9A:
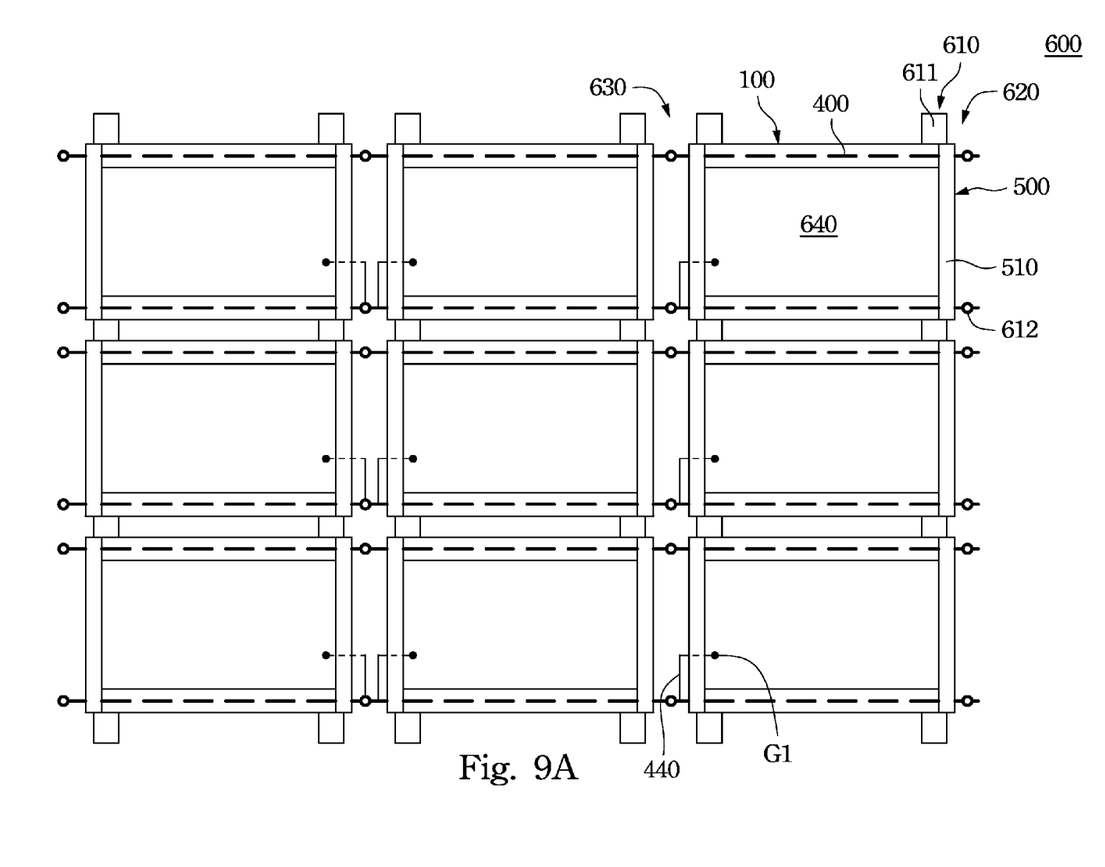
FIG. 9A is a top view of the photovoltaic array system according to one embodiment of the present disclosure.
Figure 9B:
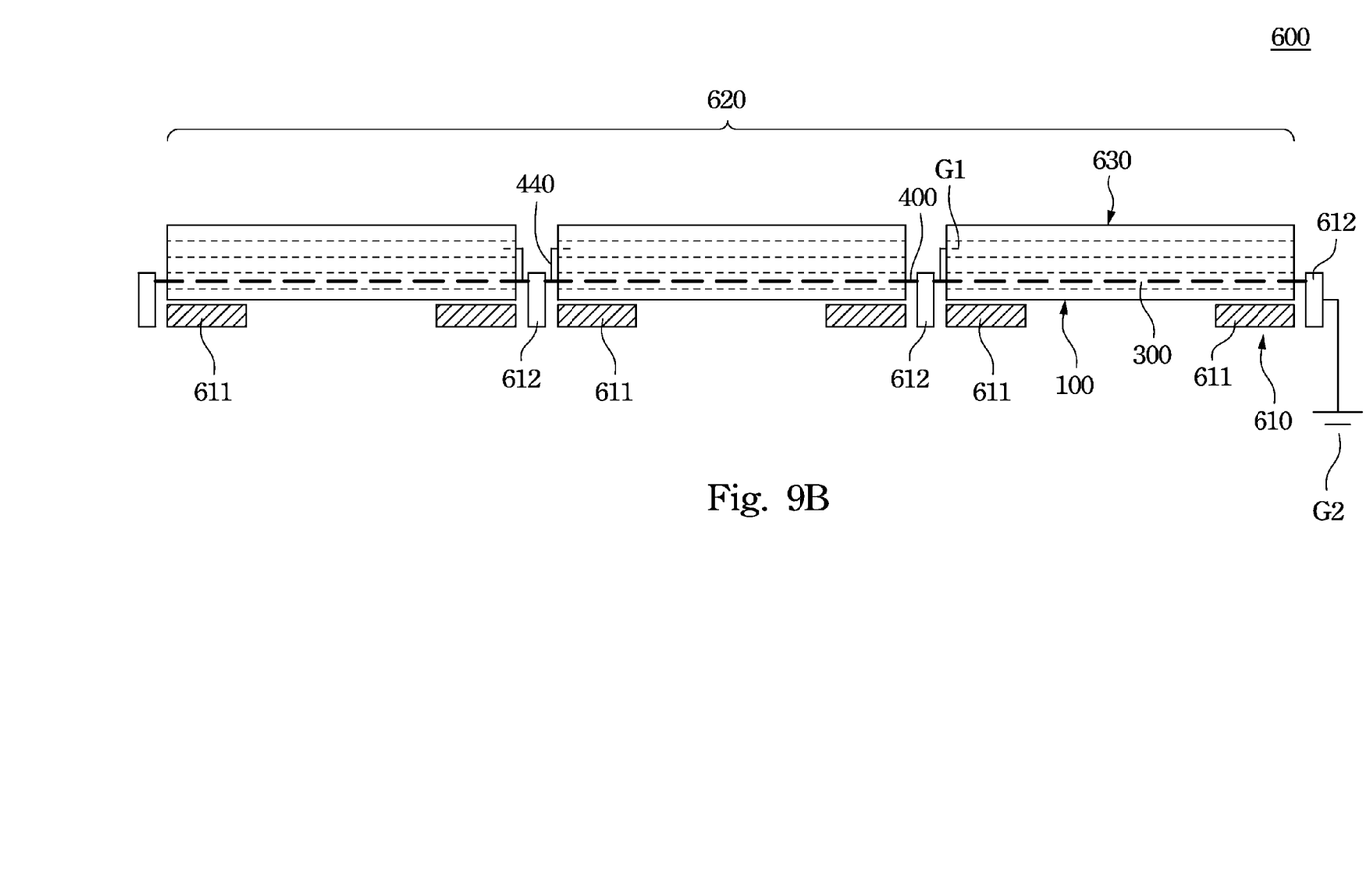
FIG. 9B is a lateral view showing the photovoltaic array system according to this embodiment of the present disclosure.

Reference is now made to FIG. 9A to FIG. 9B. FIG. 9A is a top view of a photovoltaic array system 600 according to one embodiment of the present disclosure, and FIG. 9B is a lateral view showing the photovoltaic array system 600 according to this embodiment of the present disclosure.

According to one another embodiment of the present disclosure, the photovoltaic array system 600 includes a base 610 and a photovoltaic array 620. The photovoltaic array 620 is supported on the base 610, and includes a plurality of photovoltaic devices 630 and metal wires. The base 610 includes a plurality of supports 611 and upright posts 612. The photovoltaic devices 630 are arranged in an array form. Each photovoltaic device 630 is supported by two supports 611, and each photovoltaic device 630 includes a photovoltaic panel 640, two first frame elements 100 and two second frame elements 500. Each first frame element 100 includes a first elongated main body 110, a first groove 200 and a first receiving hole 300 mentioned above. The first elongated main body 110 is formed in an elongated shape and extends along a first longitudinal axial direction X. The first groove 200 is formed on one surface of the first elongated main body 110, and formed in an elongated shape and extends along the first longitudinal axial direction X, so as to receive and hold one long side of the photovoltaic panel 640. The first receiving hole 300 is formed in the first elongated main body 110 and extends along the first longitudinal axial direction X. According to this embodiment, the first receiving hole 300 is arranged to penetrate through two ends of the first elongated main body 110, and the first receiving holes 300 of the first frame elements 100 of each row of the photovoltaic devices 630 are mutually aligned. The first metal wire 400 is formed in a linear shape, and the diameter thereof is substantially the same as the opening diameter of the first receiving hole 300. The properties of the first elongated main body 110, the first groove 200 and the first receiving hole 300 of the first frame element 100 are the same as what have been disclosed in the previous embodiment, and therefore no further illustration is provided. Each second frame element 500 includes a second elongated main body 510 and a second groove 520. The properties of the second elongated main body 510 and the second groove 520 are the same as what have been disclosed in the previous embodiment, and therefore no further illustration is provided.

The upright posts 612 are arranged outwardly at two opposite ends of each photovoltaic device 630, and are corresponding to the first frame element 100, i.e., each photovoltaic device 630 is disposed between any two adjacent upright posts 612.

Each first metal wire 400 is linearly inserted in the first receiving holes 300 which are mutually aligned, and each first metal wire 400 is parallel to the first longitudinal axial direction X. Moreover, two opposite ends of the first metal wire 400 are respectively disposed outside the first elongated main body 110, and the first metal wire 400 is fastened on the upright posts 612 distributed between the photovoltaic devices 630 in which a plurality of sections of the first metal wire 400 which are disposed outside the mutually-aligned receiving holes 300 are securely connected to the upright posts 612.

According to one alternative of this embodiment, the photovoltaic array system 600 further includes a plurality of ground wires 440. One end of each ground wire 440 is electrically connected to a ground source G1 of the photovoltaic panels 640, and the other end thereof is physically and electrically connected to the metal wire 400. The ground wires 440 can be physically or electrically connected to the grounding sources G1 one on one, or several ground wires 400 are connected in series and then are physically or electrically connected to a ground source G1.

In addition, because the upright post 612 is electrically connected to a ground terminal G2, one distal end of the first metal wire 400 is electrically connected to the upright post 612, so as to form a connection bridge between the photovoltaic panels 640 and the ground terminal G2.

Moreover, the heights of the upright posts 612 can be the same as the heights of the supports 611, such that the photovoltaic array 620 is allowed to be in a horizontal state (as shown in the figures), or the heights of the upright posts 612 and the heights of the supports are gradually reduced, such that the photovoltaic array 620 is allowed to be in an inclined state.

As what is disclosed above, the frame element of the photovoltaic device of the present disclosure has the metal wire longitudinally inserted, and the extending direction of the metal wire is the same as the extending direction of one lateral side of the photovoltaic panel of the photovoltaic device; as such, through the metal wire having the capability of stretch resistant and resisting the external pressure, when the photovoltaic device of the present disclosure is installed with the frame element, the bent and deformed degree of the photovoltaic device can be reduced when the photovoltaic device is subject to the external pressure.

Although the present disclosure has been described with reference to the preferred embodiments thereof, it is apparent to those skilled in the art that a variety of modifications and changes may be made without departing from the scope of the present disclosure which is intended to be defined by the appended claims.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. At least two metal wires respectively installed in the at least two receiving holes and extending along the longitudinal axial direction,
   two stop blocks respectively installed at two opposite ends of each of the at least two metal wires and restrained out of each of the at least two receiving holes,
   wherein the main body is partitioned into a first half part and a second half part by an imaginary separation line which horizontally passes through a centroid of a horizontal cross surface of the main body, and the groove is located in the first half part and the at least two metal wires are respectively disposed inside the first half part and the second half part of the main body.

2. The frame element of claim 1, wherein a cross-sectional area of the metal wire disposed in the first half part is smaller than a cross-sectional area of the metal wire disposed in the second half part.

3. The frame element of claim 1, wherein the receiving holes penetrates through two opposite ends of the main body.

4. The frame element of claim 1, wherein the main body further comprises:
   a lateral slit formed on a surface of the main body which extends along the longitudinal axial direction, and the lateral slit extending along the longitudinal axial direction, wherein the receiving holes longitudinally communicates with the lateral slit.

5. The frame element of claim 1, wherein the metal wire is a singular steel wire or formed from a plurality of steel wires.

6. The frame element of claim 1 further comprising:
   an anodizing layer covering an outer surface of the main body.

7. The frame element of claim 6 further comprising:
   a ground wire electrically connected to the metal wires and a ground terminal for electrically conducting the photovoltaic device with the ground terminal through the metal wires.

8. A photovoltaic device comprising:
   a photovoltaic panel; and
   at least one frame element of claim 1, wherein the groove receives and holds a long side of the photovoltaic panel.

9. The photovoltaic device of claim 8, wherein the quantity of the at least one frame element is two, and the grooves of the two frame elements are respectively receive and hold two opposite long sides of the photovoltaic panel.

10. The photovoltaic device of claim 9 further comprising:
    another two frame elements formed in an elongated shape and respectively coupled between the two frame elements for respectively receive and hold two opposite short sides of the photovoltaic panel.

11. The photovoltaic device of claim 10, wherein each of the another two frame elements further comprises:
    another receiving hole extending along another longitudinal axial direction which is perpendicular to the longitudinal axial direction; and
    at least one metal wire coordinately installed in the another receiving hole, and being in parallel to the another longitudinal axial direction.

12. A photovoltaic array system comprising:
    a base; and
    a photovoltaic array supported on the base, the photovoltaic array comprising:
    a plurality of photovoltaic devices arranged in an array form, each of the photovoltaic devices comprising:
    a photovoltaic panel; and
    a frame element, comprising:
    an elongated main body extending along a longitudinal axial direction;
    a groove formed on one surface of the main body and extending along the longitudinal axial direction and engaged with one long side of the photovoltaic panel; and
    the main body having two receiving holes formed therein and the receiving holes extending along the longitudinal axial direction, wherein the receiving holes of the frame elements of each row of the photovoltaic devices are mutually aligned; and
    two metal wires respectively passing through the mutually-aligned receiving holes and extending along the longitudinal axial direction, wherein a plurality of sections of the metal wires which are disposed outside the mutually-aligned receiving holes are securely connected to the base, wherein the main body is partitioned into a first half part and a second half part by an imaginary separation line which horizontally passes through a centroid of a horizontal cross surface of the main body, and the groove is in the first half part, and the metal wires are respectively disposed inside the first half part and the second half part of the main body.

13. The photovoltaic array system of claim 12, wherein two opposite ends of the metal wires are respectively fastened on the base.

14. The photovoltaic array system of claim 12, further comprising:
   a plurality of ground wires respectively and electrically connected to the photovoltaic panels and the metal wires.

15. The photovoltaic array system of claim 14, wherein one distal end of the metal wires is electrically connected to a ground terminal through the base.

* * * * *